United States Patent
Tseng et al.

(10) Patent No.: US 9,740,670 B2
(45) Date of Patent: Aug. 22, 2017

(54) CUSTOMIZATION OF MOBILE APPLICATIONS USING WEB-BASED TECHNOLOGY

(71) Applicant: Facebook, Inc., Menlo Park, CA (US)

(72) Inventors: Erick Tseng, San Francisco, CA (US); Philip Fung, San Francisco, CA (US); Yariv Sadan, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 290 days.

(21) Appl. No.: 14/678,917

(22) Filed: Apr. 3, 2015

(65) Prior Publication Data

US 2015/0212990 A1  Jul. 30, 2015

Related U.S. Application Data

(63) Continuation of application No. 12/972,262, filed on Dec. 17, 2010, now Pat. No. 9,026,905.

(51) Int. Cl.
*G06F 17/22* (2006.01)
*G06F 9/44* (2006.01)
*G06F 17/21* (2006.01)

(52) U.S. Cl.
CPC ........ *G06F 17/2247* (2013.01); *G06F 9/4443* (2013.01); *G06F 17/211* (2013.01); *G06F 17/2211* (2013.01)

(58) Field of Classification Search
CPC .................................................. G06F 17/211
See application file for complete search history.

(56) References Cited

U.S. PATENT DOCUMENTS

| | | | | |
|---|---|---|---|---|
| 5,881,289 A | * | 3/1999 | Duggan | G06F 9/547 714/38.14 |
| 6,421,717 B1 | * | 7/2002 | Kloba | G06F 17/30902 707/E17.12 |
| 6,453,465 B1 | * | 9/2002 | Klein | G06F 8/41 704/9 |
| 6,496,979 B1 | * | 12/2002 | Chen | G06F 8/61 717/178 |
| 6,615,253 B1 | * | 9/2003 | Bowman-Amuah | G06F 17/30902 707/999.1 |
| 6,845,394 B2 | * | 1/2005 | Ritche | G06F 8/60 709/221 |
| 7,200,809 B1 | * | 4/2007 | Paul | G06F 17/30893 707/E17.117 |
| 7,210,121 B2 | * | 4/2007 | Xia | G06F 8/60 717/106 |

(Continued)

*Primary Examiner* — Mohammed-Ibrahim Zuberi
(74) *Attorney, Agent, or Firm* — Baker Botts L.L.P.

(57) ABSTRACT

In one embodiment, receiving, at a first computing device from a second computing device, a request for a view of a user interface of a native application executing on the second computing device, wherein the view includes one or more first user interface components; determining, by the first computing device, a user agent type of the second computing device; selecting, by the first computing device, one or more second user-interface components to be included in the view based on the user agent type of the second computing device; generating, by the first computing device, code implementing a structured document that represents the view, wherein the structured document comprises the one or more first user-interface components and the one or more second user-interface components; and transmitting, from the first computing device to the second computing device, the code.

20 Claims, 5 Drawing Sheets (56) References Cited

U.S. PATENT DOCUMENTS

| | | | | |
|---|---|---|---|---|
| 7,340,730 B2* | 3/2008 | Arkwright | | G06F 9/45516 709/203 |
| 8,209,709 B2* | 6/2012 | Fleming | | G06F 9/541 719/318 |
| 2004/0143823 A1* | 7/2004 | Wei | | G06F 8/41 717/140 |
| 2006/0248506 A1* | 11/2006 | Luo | | G06F 8/38 717/104 |
| 2007/0061486 A1* | 3/2007 | Trinh | | G06F 17/30905 709/246 |
| 2007/0061488 A1* | 3/2007 | Alagappan | | G06F 17/30905 709/246 |
| 2007/0300217 A1* | 12/2007 | Tunmer | | G06F 8/38 717/177 |
| 2008/0016182 A1* | 1/2008 | Sathish | | H04L 67/30 709/219 |
| 2008/0139191 A1* | 6/2008 | Melnyk | | G06F 17/30905 455/419 |
| 2008/0282172 A1* | 11/2008 | Bayang | | G06F 9/4443 715/744 |
| 2009/0119678 A1* | 5/2009 | Shih | | G06Q 10/10 719/313 |
| 2009/0241135 A1* | 9/2009 | Wong | | G06F 9/4443 719/328 |
| 2009/0249076 A1* | 10/2009 | Reed | | G06Q 30/00 713/181 |
| 2010/0174607 A1* | 7/2010 | Henkin | | G06Q 30/02 705/14.53 |
| 2010/0241664 A1* | 9/2010 | LeVasseur | | H04M 3/4872 707/779 |
| 2010/0281475 A1* | 11/2010 | Jain | | G06F 8/68 717/172 |
| 2011/0072086 A1* | 3/2011 | Newsome | | G06F 17/30905 709/204 |
| 2011/0083069 A1* | 4/2011 | Paul | | G06F 8/60 715/234 |
| 2011/0113090 A1* | 5/2011 | Peeri | | G06F 9/4443 709/203 |
| 2011/0154305 A1* | 6/2011 | LeRoux | | G06F 8/71 717/140 |
| 2011/0320525 A1* | 12/2011 | Agarwal | | H04M 1/72561 709/203 |
| 2012/0072926 A1* | 3/2012 | Woo | | G06F 9/4443 719/328 |
| 2012/0130801 A1* | 5/2012 | Baranov | | G06Q 30/02 705/14.43 |
| 2012/0137211 A1* | 5/2012 | Lewontin | | G06F 17/30914 715/236 |
| 2012/0137233 A1* | 5/2012 | Lewontin | | G06F 17/30905 715/760 |
| 2012/0158893 A1* | 6/2012 | Boyns | | G06F 17/30905 709/217 |
| 2012/0166979 A1* | 6/2012 | Lewontin | | G06F 17/30899 715/762 |

* cited by examiner

CUSTOMIZATION OF MOBILE APPLICATIONS USING WEB-BASED TECHNOLOGY

PRIORITY INFORMATION

This application claims the benefit under 35 U.S.C. §120 of U.S. patent application Ser. No. 12/972,262 titled "Customization of Mobile Applications Using Web-Based Technology" and filed on 17 Dec. 2010.

TECHNICAL FIELD

The present disclosure generally relates to customizing native applications for mobile devices and more specifically relates to implementing native applications for mobile devices that do not require the user interfaces of the native applications to be implemented entirely in native code.

BACKGROUND

Sophisticated mobile devices are able to support many software applications. A mobile device, such as a tablet or netbook computer, a smart phone (e.g., Apple iPhone and RIM BlackBerry), or a personal digital assistant (PDA), usually has its own operating system and a set of software applications that enables its user to perform many activities. For example, with a mobile device having the necessary software applications installed thereon, a user may access web pages using a web browser application, read and send emails using an email application, read and edit documents using a word processor application, receive direction and location information using a GPS application, and take digital photos using a photo or imaging application.

SUMMARY

The present disclosure generally relates to customizing native applications for mobile devices and more specifically relates to implementing native applications for mobile devices that do not require the user interfaces of the native applications to be implemented entirely in native code.

In particular embodiments, receiving, at a first computing device from a second computing device, a request for a view of a user interface of a native application executing on the second computing device, wherein the view includes one or more first user interface components; determining, by the first computing device, a user agent type of the second computing device; selecting, by the first computing device, one or more second user-interface components to be included in the view based on the user agent type of the second computing device; generating, by the first computing device, code implementing a structured document that represents the view, wherein the structured document comprises the one or more first user-interface components and the one or more second user-interface components; and transmitting, from the first computing device to the second computing device, the code.

These and other features, aspects, and advantages of the disclosure are described in more detail below in the detailed description and in conjunction with the following figures.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In general, there are two types of software applications. One type of software application may be referred to as "native applications". Examples of the native applications may include Microsoft Office Suite, Adobe Creative Suite, and Symantec Norton 360™. Native applications are usually developed for specific computing devices having specific operating systems and need to be installed on the computing devices before they can be executed. Often, a native application developed for one type of computing device having one type of operating system cannot be readily installed for execution on another type of computing device having another type operating system. For example, a camera application developed for the Motorola Droid mobile telephones with the Google Android operating system may not be readily installed on an Apple iPhone without some code modification. This is because such native applications may have code that is platform dependent (i.e., native code). Platform-dependent code depends on the specific programming language features or libraries of a particular operating system or specific hardware components or capabilities of a particular mobile device. Consequently, native applications are platform dependent as well, which means developers of a native application may need to implement several versions of the same application for different computing devices and different operating systems. The user interface (UI) of a native application may have any number of displayable views, and each view may include any number of UI components. Each view may be individually displayed within the context the native application.

In contrast, another type of software application may be referred to as "web-based applications". Unlike native applications, web-based applications are not installed locally on the specific computing devices. Instead, a web-based application usually executes on a remote server, which may be accessible to any number of computing devices (i.e., client devices) simultaneously via a network. Each web-based application may be hosted at a particular website and has a unique Uniform Resource Locator (URL) with which it may be accessed. Examples of the web-based applications may include those applications located at www.facebook.com, www.amazon.com, and www.expedia.com. The server and the client devices may communicate using any suitable communication protocol, such as Hypertext Transfer Protocol (HTTP). Usually, the user interface of a web-based application is implemented as a series of web pages, which may be loaded and displayed in a web browser executing on a client device. The input to the web-based application is received at the client device and transmitted to the server for processing. The output of the web-based application is transmitted from the server to the client device to be displayed in the web browser. Because the web-based applications mainly execute on the servers instead of on the individual client devices (which host browser clients), they do not depend on any software or hardware features of the specific client devices. Therefore, they are not platform dependent. A web-based application executing on a server may be accessible to different types of client devices having different types of operating systems and browser clients.

Both native applications and web-based applications have certain disadvantages. For example, different versions of a native application need to be implemented for different computing devices and operating systems. On the other hand, there are certain features or functionalities that cannot be supported by a web-based application because they require native features provided by a specific operating system or a specific device.

Particular embodiments provide a convenient way to develop native applications by enabling a native application to incorporate a web-based user interface. As a result, portions of the code implementing the user interface of the native application does not need to be written as native code (i.e., platform-dependent code). Although different versions of the native application may still need to be developed for different computing devices and operating systems, a large segment of the user interface portion of the code only needs to be implemented once and may be used with all versions of the native application.

Figure 1:
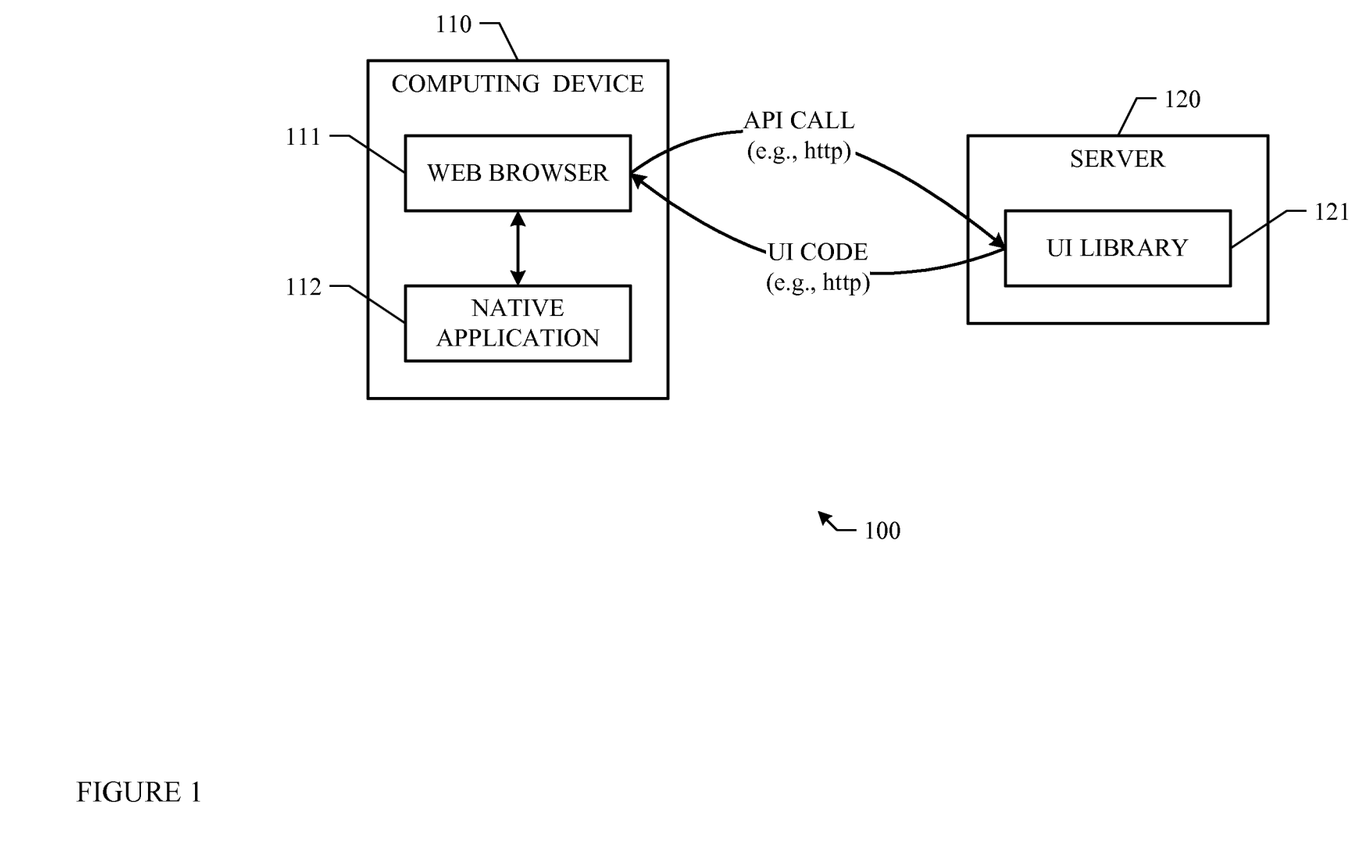
FIG. 1 illustrates an example system for a native application to have a web-based user interface.

FIG. 1 illustrates an example system 100 for a native application to incorporate a web-based user interface. In particular embodiments, a computing device 110, such as a desktop computer or a mobile device, has a native application 112 and a web browser 111. In addition, in particular embodiments, computing device 110 may also have an operation system (not shown). In particular embodiments, computing device 110 may include hardware, software, or embedded logic components or a combination of two or more such components for carrying out the appropriate functionalities implemented or supported by computing device 110. In particular embodiments, native application 112 may be written in any computing programming language and may be executed on computing device 110. In particular embodiments, if computing devices has an operation system, native application 112 may be executed within the context of the operating system. In particular embodiments, a server 120 has a UI library 121 that includes various UI-related functions. In particular embodiments, server 120 may include hardware, software, or embedded logic components or a combination of two or more such components for carrying out the appropriate functionalities implemented or supported by server 120. In particular embodiments, UI library 121 may be implemented using any suitable programming language, such as a server-side scripting language (e.g., PHP). In particular embodiments, UI library 121 may provide an application programming interface (API) so that its functions may be invoked via API calls. In particular embodiments, computing device 110 and server 120 may communicate with each other via a computer network using any suitable communication protocol, such as HTTP.

Figure 5:
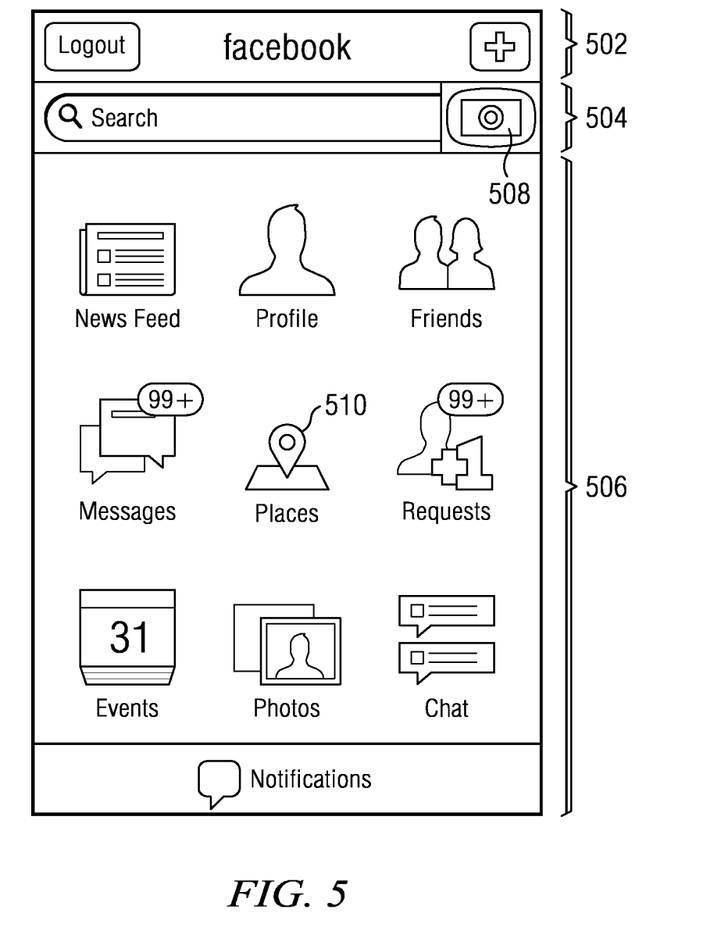
FIG. 5 illustrates an example user interface.

In particular embodiments, native application 112 has a user interface, as FIG. 5 illustrates. In particular embodiments, at least a portion of the code implementing the user interface of native application 112 is not native code compiled for computing device 110 and installed on computing device 110. Instead, in particular embodiments, when selected portions of the user interface of native application 112 are displayed, native application 112 makes appropriate API calls to UI library 121 residing on server 120 to invoke the appropriate library functions contained in UI library 121. Each API call may be transmitted from computing device 110 to server 120 using any suitable communication protocol, such as HTTP. In particular embodiments, upon receiving an API call from computing device 110, UI library 121, or more specifically, the functions invoked by the API call may generate the appropriate code (i.e., UI code), such as code written in a client-side scripting language that may be directly interpreted by a web browser (e.g., HTML, XML, and/or JavaScript), that implements all or a portion of the user interface of native application 112, and transmits the UI code to computing device 110. Again, the UI code may be transmitted from server 120 to computing device 110 using any suitable communication protocol, such as HTTP. Computing device 110, after receiving the UI code from server 120, may load the UI code in web browser 111. In particular embodiments, web browser 111 may be executed and rendered within the context of native application 112 so that the user interface of native application 112 is rendered and displayed within the context of native application 112. Alternatively, in particular embodiments, native application 112 may include native code that is capable of rendering the UI code received from server 120 to display the user interface of native application 112 without the need of a separate web browser (e.g., web browser 111).

Figure 2:
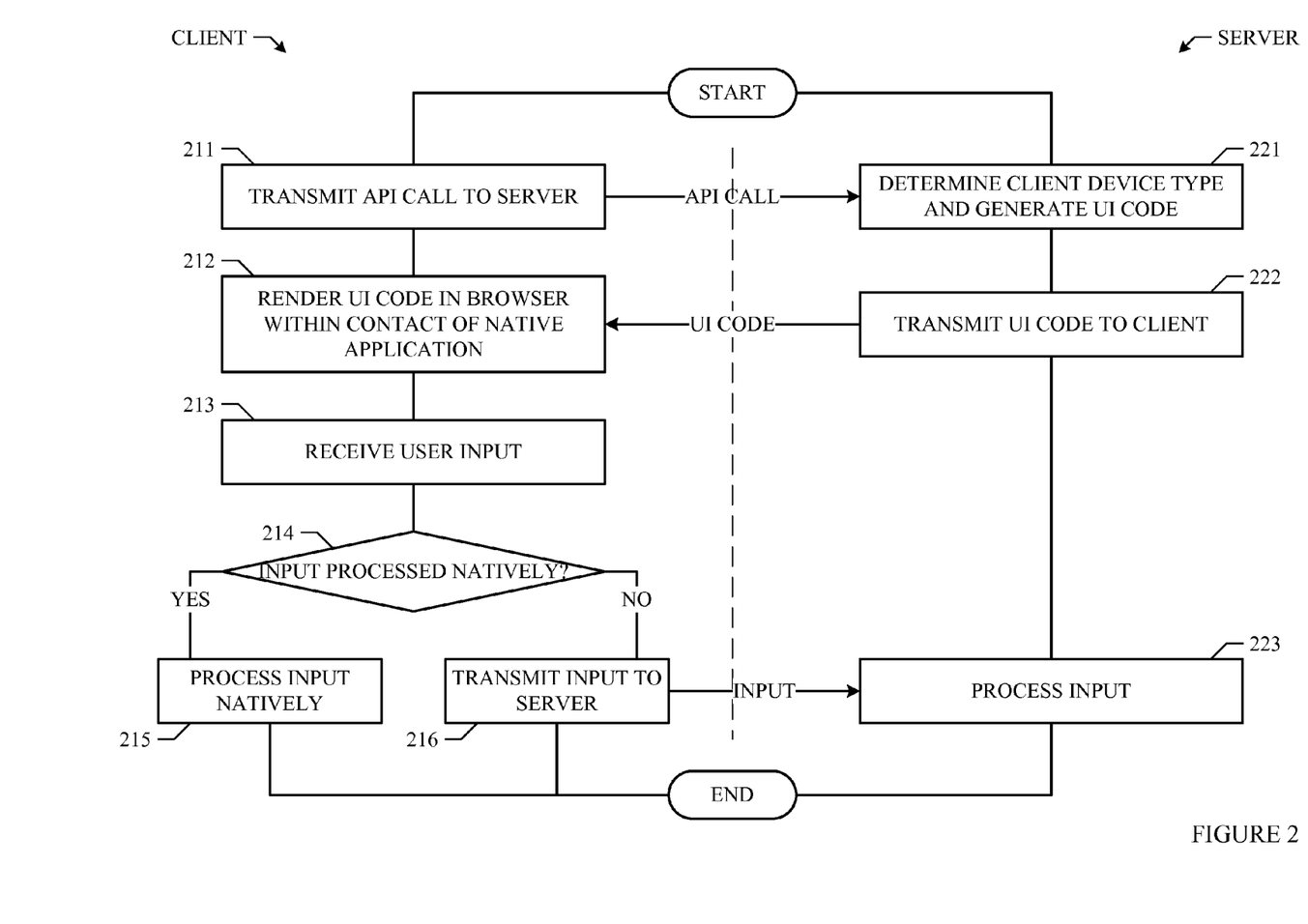
FIG. 2 illustrates an example method for a native application to have a web-based user interface.

FIG. 2 illustrates an example method for a native application to have a web-based user interface. In particular embodiments, some of the steps illustrated in FIG. 2 may be performed by a client device (e.g., a mobile device) having an operating system, a native application, and a web browser, and some of the steps illustrated in FIG. 2 may be performed by a server having a UI library.

In particular embodiments, a native application executing on a client may need to display its user interface. The native application, through the client, may transmit an API call to a server having a UI library, as illustrated in STEP 211. The API call may be in the form of a HTTP request that invokes an appropriate function included in the UI library residing on the server. In one implementation, the HTTP request includes a user agent identifier that allows the server to identify the particular application making the request in order to distinguish between a standard browser client and the native application making the request. In particular embodiments, the UI library, upon receiving the API call, may generate appropriate code implementing the user interface of the native application, as illustrated in STEP 221.

In particular embodiments, the user interface of the native application may include any number of displayable views, and each displayable view may be implemented, at least in part, as a web page or other structured document. As FIG. 5 illustrates, for example, the user interface may include a first portion 502 that is natively rendered by the application by making appropriate calls into the operating system, and additional portions 504, 506 that may be browser-based renderings of structured documents returned by a remote server. In particular embodiments, each web page may include various UI components, such as icons 510, panels, menus, text fields, check boxes, buttons 508, graphical components, etc. In particular embodiments, each web page may include a standard set of UI components that is the same regardless of on which platform (e.g., the type of client and the operating system executing on the client) the native application executes. In other words, this standard set of UI components is platform independent. The standard set of UI components may be selected based on the specification or design requirements of the native application. When generating the code for a web page, appropriate code is generated to implement each UI component from the standard set of UI components.

In particular embodiments, in addition to the standard set of UI components, a web page may also include a customized set of UI components that may vary depending on the platform (e.g., the type of client and the operating system executing on the client) the native application executes. In other words, this optional, customized set of UI components is platform dependent. For example, if the native application executes on a mobile telephone that includes a built-in camera, the web page may include a button that, when clicked, causes a digital photograph to be taken by the build-in camera included with the mobile telephone. In this case, the customized set of UI components included in the web page may include the camera button. On the other hand, if the native application executes on a mobile telephone that does not include a built-in camera, the camera button 508 may not be included in the web page. In particular embodiments, the UI library may determine the type of client device from which the API call is received and select the customized set of UI components to be included in the web page based on the device type of the client transmitting the API call, as illustrated in STEP 221. When generating the code for a web page, appropriate code is generated to implement each UI component from the customized set of UI components, if any exists. In one implementation, the server can decide which UI code to include in a web page that responds to the request based on a user agent identifier. For example, if the user agent identifies a standard browser, then the server may not add code that would render to a camera button; however, if the user agent identifies a native application hosted on a mobile device, code for rendering a camera button 508 on the phone may be included in the response. Alternatively, in particular embodiments, the customized set of UI components may be determined based on an identifier associated with the request or the native application.

In particular embodiments, the code implementing the web page that is a part of the user interface of the native application (i.e., the UI code) may be written in a language that can be directly interpreted and processed by a web browser, such as a client-side scripting language (e.g., JavaScript), HTML, and/or XML. In particular embodiments, the UI library, through the server, may transmit the UI code to the client, as illustrated in STEP 222.

In particular embodiments, each UI component, whether standard or customized, in the web page may be implemented as a separate HTML element and includes an encoded clickable link or region (e.g., an URL). In particular embodiments, the URL may be customized for each individual UI component based on the functionalities associated with that UI component. In particular embodiments, a URL associated with a particular UI component may be an URL referring to a resource on the server or may be a custom URL. A custom uniform resource locator is a reference the native application registers with the operating system. More specifically, the custom uniform resource locator is operable, when processed by a browser hosted on a client device 111, to launch the native application. For example, a custom URL can comprise "faceweb://facebook.com/home.php?control=camera" If such a standard URL (e.g., http://www.facebook.com/places.php) is clicked by a user, the corresponding resource on the server may be invoked. In particular embodiments, each clickable URL may correspond to a function in the UI library on the server or a link to a network resource. If a user of the native application interacts with the UI component by clicking on the component (activating its associated URL), a HTTP request may be sent to the server to invoke the library function or load the network resource corresponding to the clicked URL. In particular embodiments, the HTTP request may include any number of parameters specifically relevant to the UI component that has been acted upon by the user. For example, suppose the server is associated with the Facebook social-networking system. A user click on a custom URL associated with a particular UI component, however, may be intercepted and handled by the native application. Still further, in some implementations, the custom URL may be included in an embedded or inline reference that causes the native application to intercept the request on the initial page load, as opposed to a user click or other activation, and call into the operating system to perform the operation associated with the user interface control. In one implementation, the native application registers a call back function for all click events so that the native application can intercept and filter onClick events. In some implementations, other methods for distinguishing between URLs exists, such as encoding an indicator in the parameter field of a standard URL that the native application can recognize as a request to intercept and handle locally.

Upon receiving the UI code from the server, the native application may load the UI code in a web browser executing on the client to display the user interface, as illustrated in STEP 212. In particular embodiments, the web browser may be executed within the context of the native application so that the web page, which is a part of the user interface of the native application, is rendered and displayed within the context of the native application. Alternatively, in particular embodiments, the native application may include code that is capable of processing the UI code to render the web page for display within the context of the native application. In this case, the native application in fact implements the functionalities of a web browser so that it does not require a separate web browser for processing the UI code to display the web page.

In general, a user interface of an application, whether native or web-based, enables its users to interact with the application, such as providing input to the application and receiving output from the application. This is achieved using various UI components. For example, a user may provide text input to an application through a text input field, or click a button or a check box, or select a menu item, and so on. Each user action in connection with a UI component may result in an event to be generated. In particular embodiments, the native application may monitor the events resulted from a user interacting with the specific UI components included in each web page.

In particular embodiments, upon receiving a user input resulted from a user of the native application interacting with one of the UI components included in a web page, as illustrated in STEP 213, the native application may determine whether the user input should be processed natively (i.e., locally at the client by the native application itself), as illustrated in STEP 214. In particular embodiments, a user input should be processed natively if processing of and responding to the user input requires features of functionalities only available at the client, such as library functions provided by the operating system of the client or hardware components included with the client. In other words, a user input should be processed natively if processing of the user input requires native code that is not generally available on a server. For example, if the user clicks the camera button that causes a digital photograph to be taken by the build-in camera of a mobile telephone, the user input should be processed natively since it requires the usage and functionalities of the build-in camera. On the other hand, if the user submits a text message to be posted on a blog, it is not necessary to process the user input natively since it does not require any special features that are only available through the operating system of the client or hardware components included with the client. As discussed above, this decisional step is aided by encoding the URLs that correspond to the various UI elements with custom URL identifiers or other parameters.

As described above, in particular embodiments, each web page may include a standard set of UI components and optionally a customized set of UI components. The standard set of UI components is included in the web page regardless of the type of platform on which the native application executes. Therefore, these standard UI components are platform independent. The customized set of UI components is selected based on the specific type of platform (e.g., the hardware components and the operating system of the client) on which the native application executes. Therefore, these customized UI components are platform dependent. In particular embodiments, if a user input results from the user interacting with a standard UI component, the user input does not need to be processed natively at the client and may be processed at the server. If a user input results from the user interacting with a customized UI component, the user input needs to be processed natively at the client (e.g., by the native application itself).

In particular embodiments, if the user input needs to be processed natively (STEP 214-YES), then the native application processes the input at the client (e.g., with native code included with the native application), as illustrated in STEP 215. For example, if a user clicks on a camera button, the native application intercepts the request and makes calls to the operating system to launch a camera application and interface. On the other hand, if the user input may be processed at the server (STEP 214-NO), then the native application transmits the user input to the server for processing, as illustrated in STEP 216. The server, upon receiving the user input, may process it accordingly, as illustrated in STEP 223.

In particular embodiments, when a user input is transmitted to the server to be processed as a HTTP request, the HTTP request may include various parameters or arguments that are specifically relevant to the UI component being acted upon by the user. For example, the HTTP request may include an API call to the UI library. The server may parse the HTTP request to extract the API call, and then forward the API call to the UI library to invoke the corresponding function. Similarly, the custom URL that corresponds to a native UI component function may also include one or more parameters that the native application may use, such as including the parameters with an API call to the native operating system.

In particular embodiments, the steps illustrated in FIG. 2 may be repeated as needed so that different web pages of the user interface may be rendered and displayed on the client and different user inputs may be processed. For example, a user input may cause the current view of the user interface to change to another view. In this case, a second request may be transmitted from the client to the server for the new view of the user interface. The server may generate code implementing a second web page representing the new view and transmit the code to the client to be loaded in the web browser so that the second web page may be displayed within the context of the native application. By having the code implementing the user interface of the native application generated at the server, the user interface of the native application does not need to be implemented with native code. Consequently, the same version of the code implementing the user interface of the native application may be used with different versions of the native application for different platforms.

In particular embodiments, the client may cache locally some of the information relevant to the native application. For example, the client may cache some of the web page code (e.g., JavaScript or HTML code) generated by the server so that it may be loaded directly into the web browser when needed without having to request for the code from the server again. In particular embodiments, the client may pre-fetch some of the code implementing the user interface of the native application to improve the performance of the native application.

In particular embodiments, the method illustrated in FIG. 2 may be incorporated with a web-based application that implements a social-networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at "www.facebook.com" enables its users to communicate with their friends via emails, instant messages, or blog postings, organize social events, share photos, receive news of their friends or interesting events, play games, etc.

Users of a social-networking system may access the corresponding social-networking website via their associated client devices. In particular embodiments, if a user's client device has special features that are not generally available through the social-networking system, such as a built-in digital camera that can take digital photographs and upload these digital photographs to the social-networking system, a built-in or attached webcam that can take digital videos or provide video conferencing, or an audio recorder that can record digital audios, the UI components supporting these native features may be included in the individual web pages of the user interface of the social-networking system. If the user interacts with such a UI component to use a native feature, the user input may be intercepted and processed by a native application residing on the client device, instead of being transmitted to the server where the social-networking system resides. Other native features can also be accessed, such as a local file system, camera, native geo-location information, address book contacts, and the like.

Furthermore, in one implementation, the web pages returned to the native applications, when processed, can also cause the native applications to perform one or more operations independent of user clicks. For example, the custom URLs can be embedded as in-line references, that when processed by a browser component automatically generate outgoing requests that are intercepted by the native application and processed. In this manner, the web server via a structured document can make calls into a native application hosted on a client device, such as a mobile phone. For example, the web page may include a custom URL that causes the native application to download a file (identified in the parameter string of the URL) and store it as a file in the file system of the client device. Similar commands can be used to later access the stored file as well.

Figure 3:
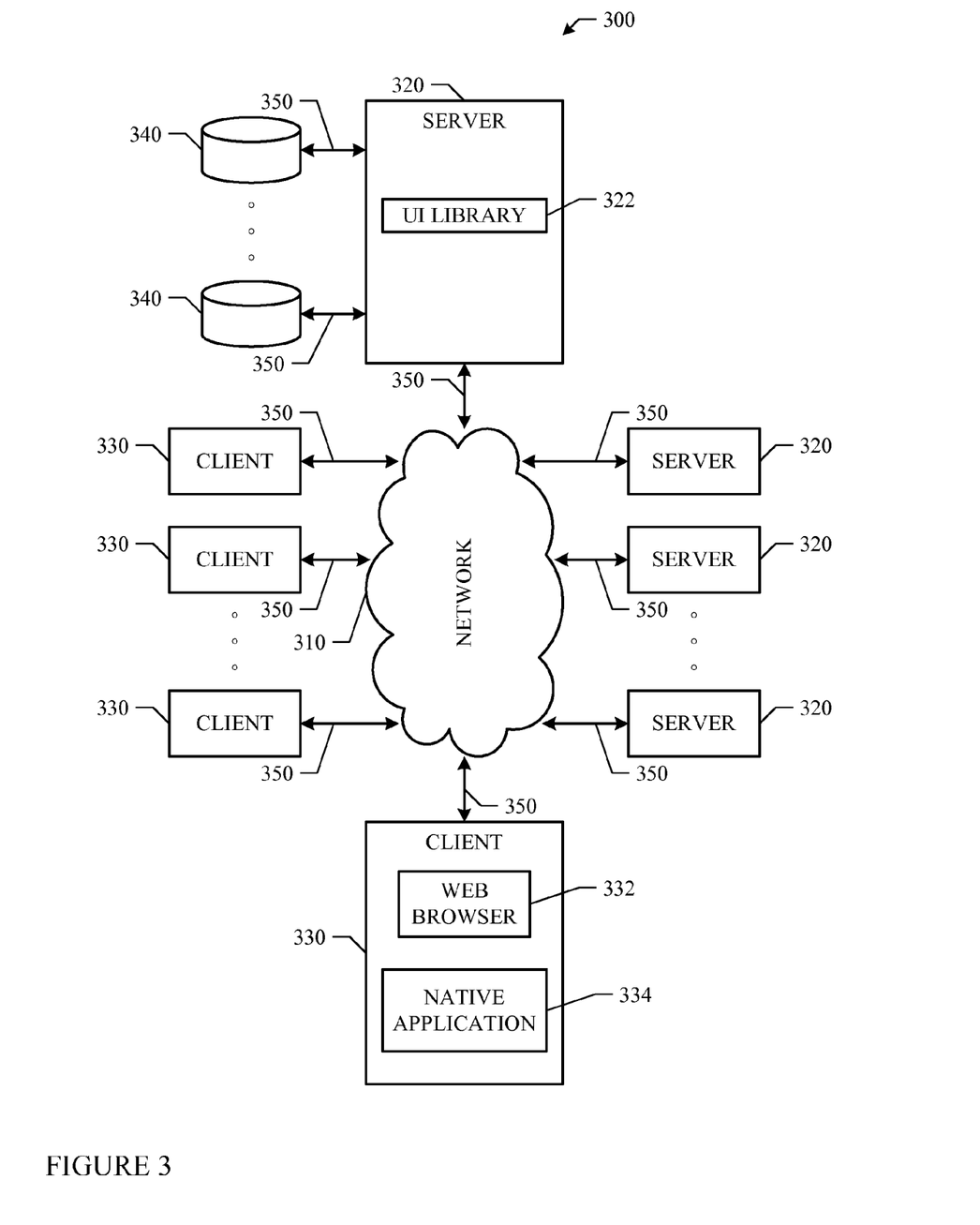
FIG. 3 illustrates an example network environment.

Particular embodiments may be implemented in a network environment. FIG. 3 illustrates an example network environment 300 suitable for providing software validation as a service. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. The present disclosure contemplates any suitable network 310.

One or more links 350 couple a server 320 or a client 330 to network 310. In particular embodiments, one or more links 350 each includes one or more wireline, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, a server 320 may include a UI library 322. In particular embodiments, UI library 322 may include various functions and be implemented using any suitable programming language. In particular embodiments, UI library 322 may implement some of the steps illustrated in FIG. 2.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. In particular embodiment, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. The present disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, a client 330 may include a native application 334. In particular embodiments, native application 334 may be implemented using any suitable programming language. In particular embodiments, native application 334 may include a user interface that is not implemented using native code. Instead, the code implementing the user interface of native application 334 is generated by UI library 322 and transmitted to native application 334 when needed. Native application 334 loads the code received from UI library 322 in web browser 332, which is executed within the context of native application 334, so that the corresponding displayable view of its user interface may be displayed within the context of native application 334. In particular embodiments, native application 334 may implement some of the steps illustrated in FIG. 2.

Figure 4:
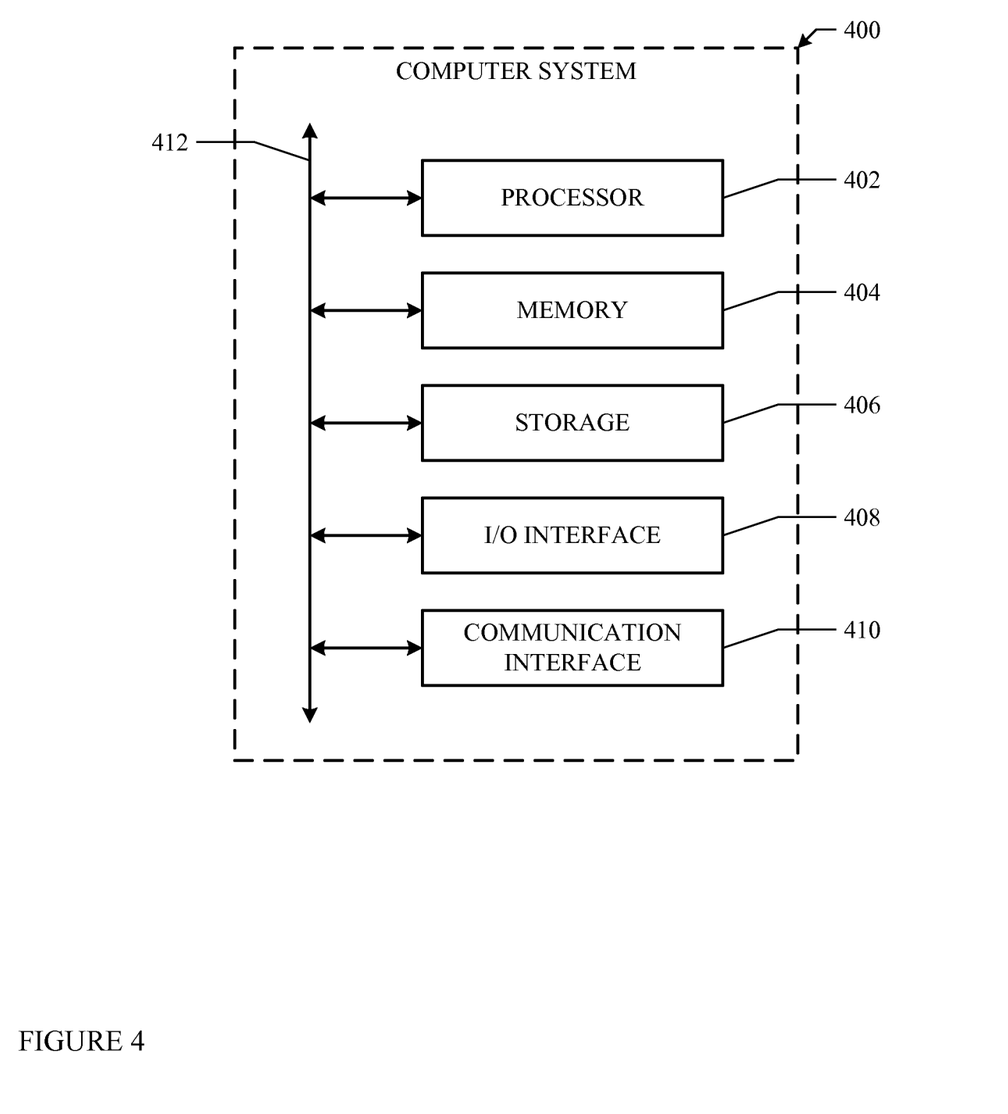
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages

406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by a server computing device, receiving from a client computing device a request for a view of a user interface of a native application executing on the client computing device, wherein the view includes one or more first user-interface components, and wherein the native application is an application installed locally on the client computing device;
by a server computing device, determining a user agent type of the client computing device;
by a server computing device, selecting one or more second user-interface components based on the user agent type of the client computing device, the one or more second user-interface components being associated with a native feature of the client computing device, the native feature comprising a hardware component native to the second-computing device;
by a server computing device, generating code implementing a structured document that represents the view, the structured document comprising the one or more first user-interface components and the one or more second user-interface components; and
by a server computing device, sending the code to the client computing device.

2. The method of claim 1, further comprising:
by a server computing device, receiving from the client computing device an application programming interface call to the server computing device, the call initiated by a user input to the client computing device through the one or more user-interface components; and
by a server computing device, sending to the client computing device a response to the call.

3. The method of claim 1, wherein each second user-interface component is associated with a customized uniform resource locator (URL) referring to the native feature.

4. The method of claim 1, wherein the code is in Hypertext Markup Language (HTML).

5. The method of claim 1, wherein the user agent type comprises an identification of the native application.

6. The method of claim 1, wherein the native feature comprises a sensor native to the client computing device.

7. The method of claim 1, wherein the native feature comprises an operating system executing on the client computing device.

8. One or more non-transitory computer-readable storage media embodying software that is operable when executed by a server computing device to:
receive from a client computing device a request for a view of a user interface of a native application executing on the client computing device, wherein the view includes one or more first user-interface components, and wherein the native application is an application installed locally on the client computing device;
determine a user agent type of the client computing device;
select one or more second user-interface components based on the user agent type of the client computing device, the one or more second user-interface components being associated with a native feature of the client computing device, the native feature comprising a hardware component native to the second-computing device;
generate code implementing a structured document that represents the view, the structured document comprising the one or more first user-interface components and the one or more second user-interface components; and
send the code to the client computing device.

9. The media of claim 8, wherein the software is further operable when executed to:
receive from the client computing device an application programming interface call to the server computing device, the call initiated by a user input to the client computing device through the one or more user-interface components; and
send to the client computing device a response to the call.

10. The media of claim 8, wherein each second user-interface component is associated with a customized uniform resource locator (URL) referring to the native feature.

11. The media of claim 8, wherein the code is in Hypertext Markup Language (HTML).

12. The media of claim 8, wherein the user agent type comprises an identification of the native application.

13. The media of claim 8, wherein the native feature comprises a sensor native to the client computing device.

14. The media of claim 8, wherein the native feature comprises an operating system executing on the client computing device.

15. A system comprising:
one or more non-transitory computer-readable storage media embodying instructions;
one or more processors coupled to the storage media and configured to execute the instructions to:
receive from a client computing device a request for a view of a user interface of a native application executing on the client computing device, wherein the view includes one or more first user-interface components, and wherein the native application is an application installed locally on the client computing device;
determine a user agent type of the client computing device;
select one or more second user-interface components based on the user agent type of the client computing device, the one or more second user-interface components being associated with a native feature of the client computing device, the native feature comprising a hardware component native to the second-computing device;
generate code implementing a structured document that represents the view, the structured document comprising the one or more first user-interface components and the one or more second user-interface components; and
send the code to the client computing device.

16. The system of claim 15, wherein the processors are further configured to execute the instructions to:
receive from the client computing device an application programming interface call to the server computing device, the call initiated by a user input to the client computing device through the one or more user-interface components; and
send to the client computing device a response to the call.

17. The system of claim 15, wherein each second user-interface component is associated with a customized uniform resource locator (URL) referring to the native feature.

18. The system of claim 15, wherein the code is in Hypertext Markup Language (HTML).

19. The system of claim 15, wherein the native feature comprises a sensor native to the client computing device.

20. The system of claim 15, wherein the native feature comprises an operating system executing on the client computing device.

* * * * *